(12) United States Patent  (10) Patent No.: US 7,769,235 B2
Anisimovich et al.  (45) Date of Patent: Aug. 3, 2010

(54) TEXT RECOGNITION METHOD USING A TRAINABLE CLASSIFIER

(75) Inventors: Konstantin Anisimovich, Moscow (RU); Vadim Tereshchenko, Moscow (RU); Vladimir Rybkin, Moscow (RU); Sergey Platonov, Zhukovsky (RU)

(73) Assignee: Abbyy Software Ltd, Nicosia (CY)

( * ) Notice: Subject to any disclaimer, the term of this patent is extended or adjusted under 35 U.S.C. 154(b) by 1414 days.

(21) Appl. No.: 10/241,638

(22) Filed: Sep. 12, 2002

(65) Prior Publication Data

US 2004/0047508 A1 Mar. 11, 2004

(30) Foreign Application Priority Data

Sep. 9, 2002 (RU) .......................... 2002123859 A

(51) Int. Cl.
*G06K 9/46* (2006.01)
*G06K 9/68* (2006.01)
(52) U.S. Cl. ....................... 382/203; 382/135; 382/190; 382/217; 382/231
(58) Field of Classification Search ................. 382/135, 382/137, 138, 181, 190, 203–205, 209, 217–231
See application file for complete search history.

(56) References Cited

U.S. PATENT DOCUMENTS

| | | | | |
|---|---|---|---|---|
| 5,131,053 A | * | 7/1992 | Bernzott et al. | 382/176 |
| 5,554,983 A | * | 9/1996 | Kitamura et al. | 340/937 |
| 5,687,253 A | * | 11/1997 | Huttenlocher et al. | 382/177 |
| 5,805,727 A | * | 9/1998 | Nakano | 382/195 |
| 5,844,991 A | * | 12/1998 | Hochberg et al. | 382/218 |
| 5,867,596 A | * | 2/1999 | Kano et al. | 382/203 |
| 5,982,912 A | * | 11/1999 | Fukui et al. | 382/118 |
| 6,028,970 A | * | 2/2000 | DiPiazza et al. | 382/309 |
| 6,232,960 B1 | | 5/2001 | Goldman | |
| 6,330,354 B1 | * | 12/2001 | Companion et al. | 382/150 |
| 6,393,159 B1 | * | 5/2002 | Prasad et al. | 382/259 |
| 6,856,697 B2 | * | 2/2005 | Lee et al. | 382/177 |

\* cited by examiner

*Primary Examiner*—Manav Seth
(74) *Attorney, Agent, or Firm*—Hahn & Moodley LLP; Vani Moodley, Esq.

(57) ABSTRACT

The present invention discloses a method of character and text recognition of a bit-mapped graphic file received from an optical scanning device. The method comprises a trainable template cache, a preliminarily trained feature analysis means, and a context analysis means. The present invention discloses the way to use said means for achieving the best results in recognition. The method supposes that the template cache along with the context analysis means are used as the main shape characteristic analyzing means. The feature analysis means along with the context analysis means are used as subsidiary shape characteristic analyzing means and as a training means for the template cache. The method comprises applying the main shape characteristic analyzing means and optionally applying the subsidiary shape characteristic analyzing means if no or not enough reliability of recognition is achieved after the template cache analyzing. The obtained results are analyzed and sent to the template cache for template training.

9 Claims, 1 Drawing Sheet

TEXT RECOGNITION METHOD USING A TRAINABLE CLASSIFIER

BACKGROUND OF THE INVENTION

1. Field of the Invention

The present invention relates to the field of optical character recognition systems and, more particularly, to a method for performing optical character recognition of printed text.

2. Prior Art

A number of optical character recognition (OCR) systems are known in the art. Typically, such systems comprise apparatus for scanning a page of printed text and performing a character recognition process on a bit-mapped image of the text. The characters may then be stored in a file on a computer system for processing by a word processor or the like.

Known OCR systems may be generally divided into two categories. Optical character recognition systems in the first category recognize either a single font or a limited number of fonts and their input is usually restricted to monospaced type of a specific point size. Optical character recognition systems in the second category are typically termed omnifont systems. Such systems are capable of recognizing a large number of typefaces in a wide range of point sizes, either monospaced or proportionally spaced. In general, optical character recognition systems that recognize a plurality of typefaces are not capable of processing documents as quickly as systems that recognize a limited number of specific fonts.

Therefore, an object of the present invention is to develop an optical character recognition method which allows a page of text to be recognized with less errors than are typical of prior art, more quickly and using less system resources.

These and other objects of the present invention will be described in more detail with reference to the Detailed Description of the Present Invention and the accompanying drawing.

SUMMARY OF THE INVENTION

An optical character recognition method is described.

The present invention discloses a method to allow characters on the page to be recognized and output in an order that is logically the same order as that employed by a person reading the page. The present invention accomplishes this object by parsing the page into a plurality of regions and outputting the regions to a character recognition process in an order that is usually the logical reading order of the page.

The present invention further discloses a character recognition process comprising a combination of a template matching process, a feature analysis process and a context analysis process. The template cache that is used for template matching is trainable. The feature analysis process allows characters to be recognized based on their shapes. Utilizing the feature analysis process of the present invention, it is possible to recognize characters in any number of different fonts. Further, by utilizing the template matching processes of the present invention in concert with the feature analysis processes, reasonable throughput of documents is achieved without the requirement of providing template libraries.

The present invention further discloses a context analysis process that completes the recognition process by iteratively resolving ambiguities of shape so as to minimize the number of typographic or semantic inconsistencies; residual inconsistencies are flagged as low confidence level identifications.

Further, the present invention discloses a method that enhances recognition quality, increases operating speed and decreases the number of errors.

DETAILED DESCRIPTION OF THE INVENTION

Figure 1:
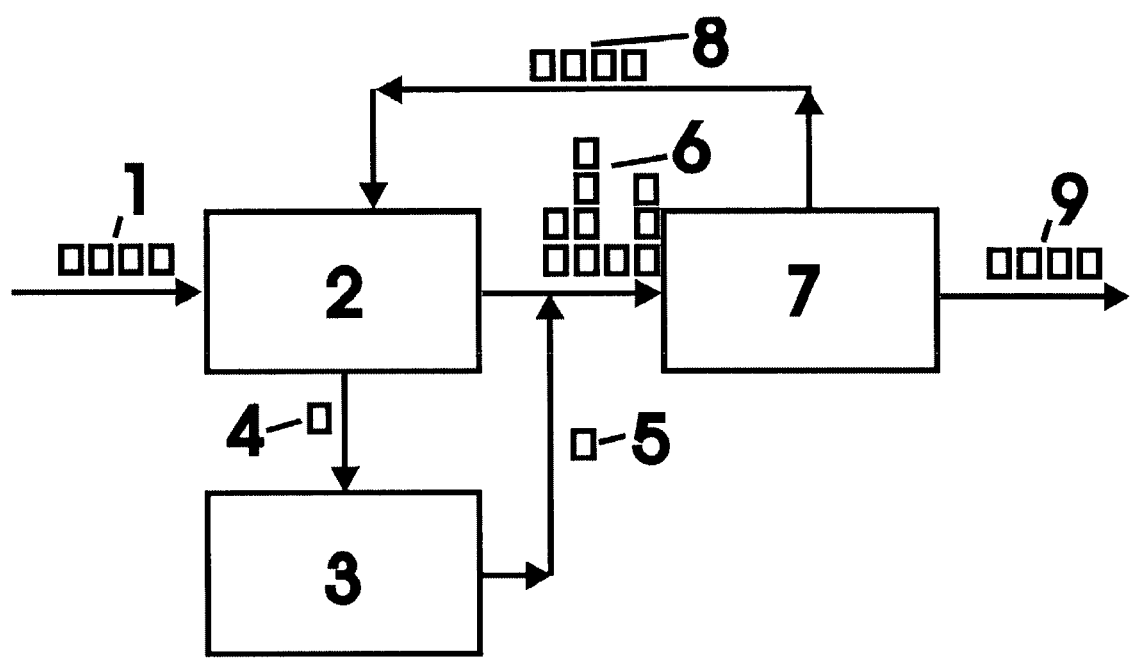
FIG. 1 is an overall flow diagram of the optical character recognition method of the present invention.

A method of recognition of characters from a bit-mapped file received from a scanning device is described. However, the present invention may be practiced without most of the description details mentioned below as is obvious to an individual skilled in the art. Referring to FIG. 1, an overall flow diagram of the present invention is shown.

Utilizing methods of the present invention, a region comprising a plurality of images in a bit-mapped file supposed to form a word is sent to a template cache, image by image, for recognition. In the template cache, the input image is compared with a plurality of stored templates.

The template images are created as an averaged total of images accepted for training.

The measure of similarity is a weighted total of pixel intensity differences of compared images.

If a similar template is found, the corresponding character is accepted as recognized.

If no similar template is found, a new template is generated.

A process termed context analysis is used to examine the correctness of recognition using the template cache or feature analysis and to reduce the plurality of possible characters.

Finally, the recognized characters are formatted for output.

The page-, region- and line-parsing processes as well as skew elimination are beyond the bounds of this invention and therefore omitted.

Referring now to FIG. 1, the character recognition process comprises the steps of template matching, block 2, followed by feature analysis, block 3, if the character was not recognized by the template matching step, and then in any event by the context analysis step, block 7.

The template matching process, block 2, attempts to match characters 1 passed in windows from the line parsing process to templates of already identified characters. The feature analysis process, block 3, attempts to recognize features of characters 4 that could not be matched to templates. After shape identification, a plurality of possible characters with corresponding reliability, blocks 5 and 6, are forwarded for context analysis, block 7. The context analysis process, block 7, refines the results of the recognition process, determining the narrowed list of possible words, block 9.

The context analysis results 8 are sent then to the template cache for its training.

As one inventive aspect of the present invention, characters which are recognized by a combination of the feature analysis process and the context analysis process are used as templates for recognition of later occurring characters. In the preferred embodiment, a template cache is built for each new document. The template cache comprises characters that have been recognized through the feature analysis process for the current document. Characters in the template cache are utilized in the template matching process. By building the template cache based on characters recognized in the document through the feature recognition process, the present invention allows for recognition of any font recognizable with the feature analysis routines. By combining elements of feature analysis, template matching and context analysis, the present invention offers the performance advantages of a template matching system with the omnifont characteristics of a feature analysis system.

Template Matching

The template cache comprises information for each available template for the current document. Each template is an averaged image composed of those used for training.

Each time a new window comprising unidentified pixel information is received from the line parsing routine, averaged images are created for the unidentified image. The unidentified image in the window is then compared against characters in the template cache. Each time a match occurs against a template, the template's reliability value is incremented.

When a template is first created as a result of being recognized by the feature analysis routines along with context analysis means, the template's match counter is set to 0. When an unidentified image processed by the template matching routines matches a particular template, the particular template's match count is tested to determine if the match count is 0. If the match count is 0, the preferred embodiment of the present invention examines the image in the character window utilizing the feature analysis routines to obtain confirmation that the image in the character window is the same character as identified by the template. If the feature analysis routines confirm the template and the image in the character window is the same character, the match count is incremented. Otherwise, the process assumes that the template yields unreliable results and the template is discarded from further processing. The recognition of the image in the character window then continues by attempting to match the image in the character window against other templates in the template cache.

As described above, if the template has a match count of 0, the image in the character window is also analyzed with the feature analysis routines to confirm the identification. Otherwise, the identification code for the recognized shape is placed in the galley for later processing by the context analysis routines, block 7.

If not passing the corresponding test described above and if more templates exist in the template cache, the same series of tests are made against each successive template in the template cache until a match occurs or the cache is exhausted.

As a result a plurality of possible characters, block 6, with corresponding matches are sent as possible words to context analysis routine.

The reliability value of a character recognized by the template cache but rejected by context analysis is decremented.

The template whose reliability value reached the predefined low level is discarded from further processing.

If there are no more templates in the template cache, none of the current templates match the unidentified image. This occurs whenever the unidentified image differs in font, size or registration from all of the characters in the template cache. The no-match condition may also be a result of characters that are although of the same font and size, are not a close enough match to be within the tolerances of the template matching routines.

In any event, if the image is not recognized, the feature analysis routines, block 3, are called using the image in the character window as input.

Feature Analysis Routine

The preferred embodiment of the present invention discloses use of a plurality of routines for analyzing the features of images passed as input to the feature analysis process to determine the category of the shape of an unidentified image in the character window. The plurality of routines comprises one routine for each unique species of shape in the standard character set. Each of these individual routines is capable of analyzing an image in a character window and providing as output an indication whether or not the image belongs to the generic shape category discriminated by the routine. The character recognition routines are exited when one of the routines responds with a positive indication that the image in the character window is the shape corresponding to that particular routine. If none of the feature analysis routines respond positively, the shape of the image in the character window remains unidentified. In this case, further processing is performed to try to identify the shape of the image in the character window.

After completing an analysis it returns either the ASCII code or the shape code for the particular image or information identifying the reason why the image was rejected. If the image is recognized, the entire plurality of symbols supposed to form a word is sent to context analysis (see below) for final identification, and then a template is built or generated for each character as described above in connection with template matching.

Otherwise, the image in the character window is moved to the reject cache.

Context Analysis

The character recognition process identifies characters by their shape. However, the shape of the character alone may not be deterministic of what the character is. For example, a lower case "z" may not be distinguishable from an upper case "Z". As another example, an apostrophe is not distinguishable from a comma based strictly on its shape. The context analysis routine accepts as input and utilizes as output the galley of character codes created by the character recognition routines. Context analysis is performed on one word or one line of the page at a time to attempt to resolve ambiguities.

The context analysis process comprises a data base of characteristic attributes of various characters. These attributes may include information on whether the character is typically found entirely above the baseline of the character line or whether a tail or other portion of the character typically extends below the baseline. The data base also comprises information regarding the relative size of characters which are normally ambiguous when identified by shape alone. For example, the data base may comprise information for distinguishing between an upper case "Z" and a lower case "z" based on the expected relative size.

Each line, or sometimes only one word from the page is copied from the galley into a buffer to prepare for further processing. During the process of copying a word or a line to the buffer, values are assigned to characters such as information on whether the character sits above the baseline and whether the relative size of the character indicates whether it is upper or lower case. Spacing between words is also determined at this point. Importantly, as ambiguities are resolved for one character, the present invention utilizes information gained from resolving such ambiguities to assist in resolving ambiguities about neighboring characters.

Certain character types such as underlines are moved to the end of the buffer area. This allows these characters to be effectively ignored during the majority of the context analysis processing. Such characters are restored to their previous positions in the line near the completion of the character analysis process.

After preparing a line or a word for context analysis, block 6, a first pass is made through each character on the line or in the word, to attempt to resolve ambiguities. This first pass looks at such characteristics as the relative height of characters in each word, the positions relative to the baseline, etc. For cases in which there is an ambiguity in determining whether a character is a numeral or a letter, the character is analyzed in relation to the other characters that neighbor it to determine whether they are numeric or alphabetic. Determining character ambiguities is an iterative process during which the main rules about the possible positional relationship of characters are used in analyzing a particular character. After all characters in a word have been examined, consistency checks are performed. If one or more characters are found to have inconsistent characteristics, all characters in the word are flagged as being possibly wrongly interpreted. A second pass of the context analysis routine is intended to correct the interpretation.

After completing the first pass context analysis for each word or line in the galley, the context analysis routine attempts to assign a font identification number to each character in the galley and to determine character sizes for each font. Font identification is propagated through the galley by tracing through all of the characters that were identified by templates. All of the characters that matched a particular template are linked together in a linked list having a root pointing to a particular template. Based on these linked lists of characters, words are assigned to fonts on the premise that words containing characters identified by the same template are of the same font. This is a lengthy, iterative process. Histogram information is then prepared detailing the height of the upper and lower case characters for each font.

A second pass is then made through each line in the galley. Words that were flagged during the first pass as having inconsistencies are again analyzed to determine which characters are incorrect. The second pass checks such items as baseline uniformity, character size uniformity, alphabetic/numeric context, etc.

The context analysis routine also attempts to merge characters which may have been split by the character recognition routines. For example, two characters which may have been recognized by the character recognition routines as an open parenthesis "(" followed by a close parenthesis ")" may actually be the letter "o". The context analysis routines attempt to merge such split characters by recognizing the proximity of particular character pairs.

Finally, if there are still words flagged as being possibly wrongly interpreted they are marked for the second pass template cache and context analysis to correct the interpretation after completing analysis of the whole document.

The context analysis routines attempt to identify unidentified characters by merging together broken pieces of characters, resubmitting characters to the character recognition routines allowing less stringent constraints for the recognition, using a dictionary, etc.

The reliability value of a template can be expressed via a number of training iterations thereof.

The output from the context analysis routines is the completed scanned page having ASCII character representations for characters on the page in the normal reading sequence of the characters.

We claim:

1. A method of recognition of characters from a bit-mapped graphic file received from an optical scanning device comprising a template cache for recognized characters, feature analysis means, context analysis means,
    said template cache along with said context analysis means are used as a first shape characteristic analyzing means, said feature analysis means along with said context analysis means are used as a second shape characteristic analyzing means and as a training means for template cache,
    said method comprising the steps of
    initially emptying the template cache;
    analyzing the shape characteristics of each character by said first shape characteristic analyzing means;
    analyzing the shape characteristics of each character by said second shape characteristic analyzing means if no or not enough reliability of recognition is achieved after the template cache analyzing;
    analyzing the results of said shape analyzing routines by said context analysis means;
    sending results of said context analysis to said template cache for template training; and
    training said template cache comprising:
        comparing a resemblance of a bit-mapped image recognized by one of said first and second shape characteristic analyzing means with existing templates using a weighted total of pixel intensity differences of compared images as a measure of similarity thereof;
        generating a new template if no resemblance is found;
        adjusting the existing template if resemblance is found comprising the steps of
            correcting an averaged template image corresponding to said existing template by said new bit-mapped image; and
            increasing a reliability value of said existing template by the new bit-mapped image reliability value;
        marking the said existing template as open for training if its reliability value is lower than the predefined reliability level;
        marking the said existing template as closed for training if its reliability value is higher or equal to the predefined reliability level.

2. The method as recited in claim 1 wherein if a context analysis reliability value of a word is lower than a predefined level thereof, the word is marked as requiring further analysis by said context analysis means.

3. The method as recited in claim 2 wherein after completing the analysis by said context analysis means, said further analysis is started relating to words with marked characters.

4. The method as recited in claim 1 wherein said characters that are not at all recognized or recognized with insufficient reliability can be reconstructed with the help of a dictionary.

5. The method as recited in claim 1 wherein the each template comprises a template image determined as an averaged total of images received for training.

6. The method as recited in claim 1 wherein the measure of similarity is calculated as weighted total of pixel intensity difference of compared images.

7. The method as recited in claim 1 wherein said reliability value of said template rejected by context analysis means is decremented.

8. The method as recited in claim 7 wherein when the reliability value of said template decreases lower than the predefined minimal level, the said template is deleted from the template cache.

9. The method as recited in claim 1 wherein said template reliability value can be expressed via a number of training iterations thereof.

* * * * *

UNITED STATES PATENT AND TRADEMARK OFFICE
CERTIFICATE OF CORRECTION

PATENT NO. : 7,769,235 B2  
APPLICATION NO. : 10/241638  
DATED : August 3, 2010  
INVENTOR(S) : Konstantin Anisimovich et al.

It is certified that error appears in the above-identified patent and that said Letters Patent is hereby corrected as shown below:

Column 1, line 42, delete the text ". . . and output in an order that is logically the same order as that employed by a person reading the page" ending at column 1, line 44.

Column 1, line 45, delete the text ". . . and outputting the regions to a character recognition process in an order that is usually the logical reading order of the page" ending at column 1, line 47.

Column 1, line 50, delete the text beginning "The template cache that is used for. . ." and ending ". . . as low confidence level identifications" at column 1, line 64.

Column 2, line 54, delete the text beginning "In the preferred embodiment, a template . . ." and ending ". . . with the feature analysis routines" at column 2, line 63.

Column 3, line 11, delete the paragraph beginning "When a template is first created . . ." and ending ". . . against other templates in the template cache" at column 3, line 29.

Column 3, line 47, delete the paragraph beginning "If there are no more templates . . ." and ending ". . . tolerances of the template matching routines" at column 3, line 54.

Column 3, line 64, delete the text beginning "The plurality of routines comprises one routine . . ." and ending ". . . why the image was rejected" at column 4, line 13.

Column 4, line 25, delete the text beginning "For example, a lower case . . ." and ending ". . . attempt to resolve ambiguities" at column 4, line 32.

Column 4, line 34, delete the text beginning "These attributes may include information on whether . . ." and ending ". . . based on the expected relative size" at column 4, line 43.

Column 4, line 50, delete the text beginning "Spacing between words is also determined . . ." and ending ". . . near the completion of the character analysis process" at column 4, line 60.

Signed and Sealed this  
Ninth Day of April, 2013

Teresa Stanek Rea  
*Acting Director of the United States Patent and Trademark Office*

CERTIFICATE OF CORRECTION (continued)
U.S. Pat. No. 7,769,235 B2

Column 4, line 63, delete the text beginning "This first pass looks at such . . ." and ending ". . . whether they are numeric or alphabetic" at column 5, line 2.

Column 5, line 5, delete the text beginning "After all characters in a word have been . . ." and ending ". . . intended to correct the interpretation" at column 5, line 11.

Column 5, line 16, delete the text beginning "Font identification is propagated through the galley . . ." and ending ". . . proximity of particular character pairs" at column 5, line 39.

Column 5, lines 53-54, delete the text "in the normal reading sequence of the characters.".